United States Patent [19]

Abraham et al.

[11] Patent Number: 5,048,085
[45] Date of Patent: Sep. 10, 1991

[54] TRANSACTION SYSTEM SECURITY METHOD AND APPARATUS

[75] Inventors: Dennis G. Abraham, Concord; Steven G. Aden, Charlotte; Todd W. Arnold, Charlotte; Steven W. Neckyfarow, Charlotte; William S. Rohland, Charlotte, all of N.C.

[73] Assignee: International Business Machines Corporation, Armonk, N.Y.

[21] Appl. No.: 418,068

[22] Filed: Oct. 6, 1989

[51] Int. Cl.$^5$ .............................................. H04K 1/00
[52] U.S. Cl. ...................................... 380/23; 380/25
[58] Field of Search .................................. 380/25, 23

[56] References Cited

U.S. PATENT DOCUMENTS

| | | |
|---|---|---|
| 3,702,464 | 11/1972 | Castrucci . |
| 4,211,919 | 7/1980 | Ugon . |
| 4,691,355 | 9/1987 | Wirstrom et al. ............. 380/23 |
| 4,694,492 | 9/1987 | Wirstrom et al. ............. 380/23 |
| 4,816,653 | 3/1989 | Anderl . |
| 4,885,788 | 12/1989 | Takaragi et al. .............. 380/23 |
| 4,935,962 | 6/1990 | Austin ........................... 380/23 |
| 4,944,008 | 7/1990 | Piosenka et al. ............. 380/23 |
| 4,962,533 | 10/1990 | Krueger et al. ............... 380/23 |
| 4,965,827 | 10/1990 | McDonald ..................... 380/23 |
| 4,969,188 | 11/1990 | Schöbi ........................... 380/23 |

Primary Examiner—Thomas H. Tarcza
Assistant Examiner—David Cain
Attorney, Agent, or Firm—Karl O. Hesse

[57] ABSTRACT

An improved security system is disclosed which uses an IC card to enchance the security functions involving component authentication, user verification, user authorization and access control, protection of message secrecy and integrity, management of cryptographic keys, and auditablity. Both the security method and the apparatus for embodying these functions across a total system or network using a common cryptographic architecture are disclosed. Authorization to perform there functions in the various security component device nodes in the network can be distributed to the various nodes at which they will be executed in order to personalize the use of the components.

68 Claims, 15 Drawing Sheets

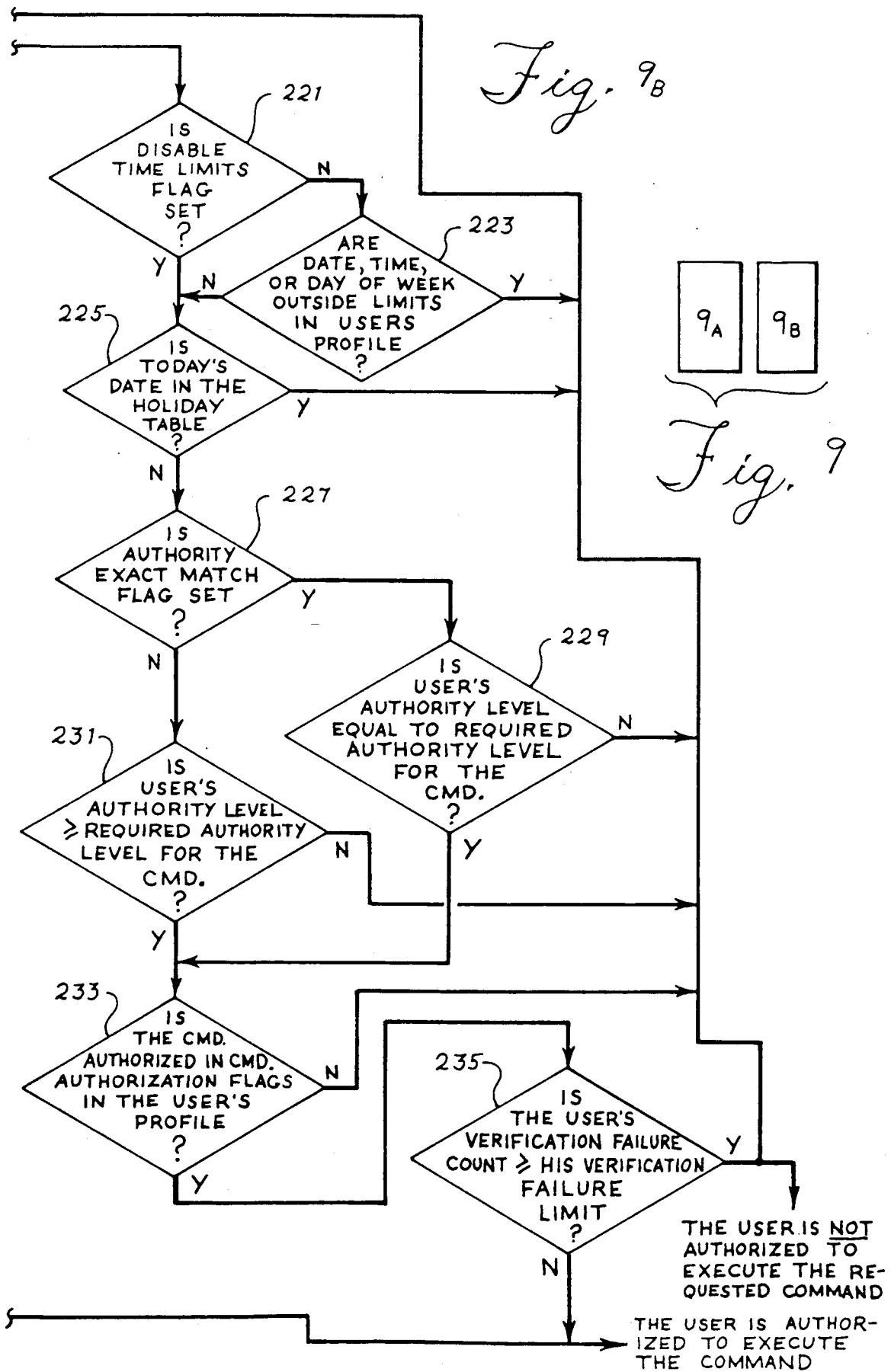

| Command Class | Description or Examples |
|---|---|
| Status | Read device status |
| Control | Set/reset LED, generate tone, lock keypad, etc. |
| Cryptographic Functions | MAC, Encipher/Decipher, etc. |
| Key Management | Load keys, import keys, export keys, etc. |
| Data I/O | Allocate, read, write, delete, etc. for data blocks on the IC card |
| User Verification | Verify user's identity using PIN or signature verification, enroll user's signature, etc. |
| Secure Session | Establish secure cryptographic sessions between devices |
| Read Data | Read user data, configuration data, logs, etc. |
| Load Data | Load tables, configuration data, etc. |
| IML | Download new microcode to a device |
| Diagnostic | Communications tests, signature pen tests, etc. |
| Miscellaneous | Reset devices, set/read clock, etc. |

Fig. 12

TRANSACTION SYSTEM SECURITY METHOD AND APPARATUS

BACKGROUND OF THE INVENTION

1. Technical Field

This invention relates to security for networks including computer terminals and portable personal data carriers such as IC cards, sometimes called smart cards or chip cards, having an onboard computer and electronic memory for storing data and processing commands.

2. Description of the Prior Art

The use of identification cards having computing power and memory built into the card, has been described in the technical literature for some time. Examples are U.S. Pat. No. 4,211,919 to Ugon, and U.S. Pat. No. 3,702,464 to Castrucci. A disadvantage of known prior art IC cards that use electrically erasable programmable read only memory (EEPROM) is that the life of an EEPROM is defined by the number of write cycles (e.g., 10,000) before a write failure occurs. Accordingly, the usable life of an IC card using the memory is also limited.

On-card security protection is taught by U.S. Pat. No. 4,816,653. Security is provided in this prior art teaching by having multiple levels of user authorization. Access to a command and to data depends upon who is the current holder of the card, the authority level required to execute a command, and also depends on password data protection contained in the header of each data file.

While providing significantly better user authority checking and security than provided by magnetic stripe identification cards, the above referenced IC cards operate primarily as only semi-intelligent peripheral memory devices. That is to say, the cards respond to read and write command primitives from the workstation, and provide data or record data if the password of the person at the workstation indicates that the person has the authority to perform the requested command. Further, the interface to the prior art IC cards is not well defended. An attack can be made by monitoring the interface while passwords are transferred to or from the card.

Also, the security systems in use with IC cards of the prior art are of a fixed architecture and not easily adapted to differing applications from point of sale to social security or other as of yet unidentified applications. Likewise, when each decision must be referred to the card for processing, a significant number of binary, yes/no responses are provided by the card which may expose the card to attack by unscrupulous persons.

SUMMARY OF THE INVENTION

In accordance with the invention, a highly flexible and secure identification IC card and a distributed authorization system are provided. The invention provides an integrated set of system security capabilities, utilizing the improved identification card of the invention to enhance system component authentication, user identity verification, user authorization and access control, message privacy and integrity protection, cryptographic key management, and transaction logging for audit purposes.

A security system using the invention embodies user authorization in the form of several independent profiles, configurable and programmable by the application owner subsequent to the manufacture of the IC card. Required conditions for the execution of each command are individually programmable by the application owner, using command configuration data. Access to a command is controlled by the content of a user's authorization profile in conjunction with the command configuration data for the requested command.

The user profiles may be downloaded into other security devices in the system for the purpose of controlling use of commands, files, and programs in system component devices, in addition to the IC card itself. The downloaded profile temporarily replaces the authorization profile already active in the other device.

The device command configuration data is not downloaded. The downloaded user authorization profile defines the user's security level and authorizations, while the device command configuration data defines the authorization required by that device to execute a requested command in that device. The same or different commands in other devices to which the user's authorization profile is tranferred may have greater or lesser security requirements defined in their command configurations.

The cryptographic keys associated with file and program authorization flag bits in the user authorization profiles that are downloaded into other security system components of an intelligent workstation or other computer facility, control access to files and programs in that workstation or computer facility.

The command set of the IC card is not fixed. Through use of tables and additional microcode, loaded into the electrically alterable programmable read only memory (EEPROM). new commands can be added to the command set, or existing commands can be replaced with updated versions. Control can also be passed to added microcode in the EEPROM at specific critical points in the IC card supervisor microcode, including initialization, communications, and authorization checking.

The definition of data storage blocks in nonvolatile memory and the read/write access to those data blocks are controlled by security and control information including access prerequisites, stored in the header of each data block in conjunction with the current users authorization profile.

The life of the EEPROM in the IC card is defined by the number of write cycles (e.g., 10,000) before any write failure occurs. For applicable functions, data is written into the memory in such a way as to optimize the total life of the IC card by spreading write cycles across many different storage locations.

BRIEF DESCRIPTION OF THE DRAWINGS

FIGS. 9, 9a and 9b is a more detailed flow chart of the authorization checking of FIG. 7.

FIG. 12 is a summary of the commands for most of the security devices in the network of the invention.

DETAILED DESCRIPTION OF PREFERRED EMBODIMENT

Figure 1:
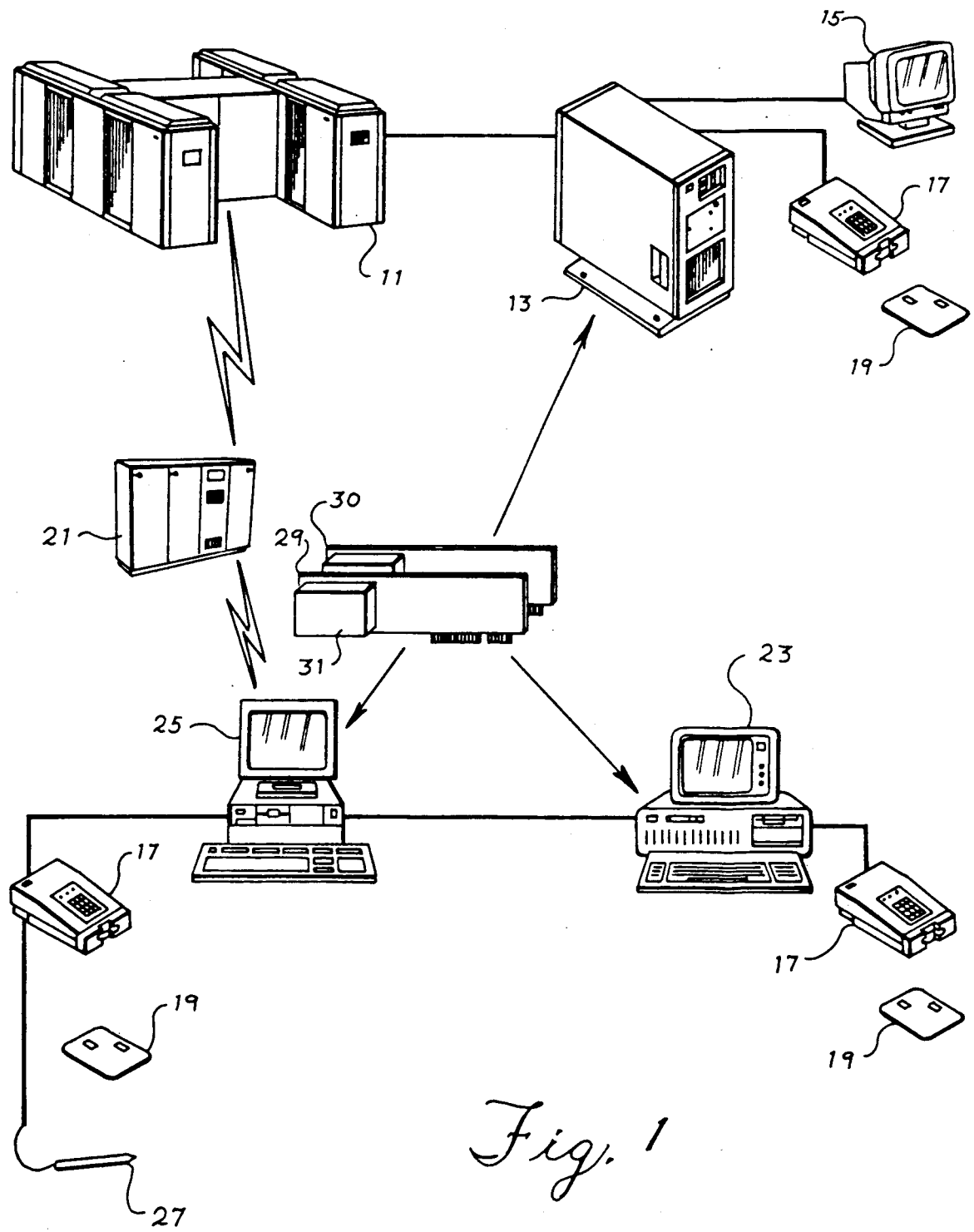
FIG. 1 is a view of the security component devices of the system of the invention.

Referring now to FIG. 1, the security component devices are shown in a network environment in which they find utility. The heart of such a network is a host computer 11 which usually will be connected via telecommunication lines to other host computers which are not shown. Host computer 11 performs all the usual data processing tasks for which it is programmed and, in addition, executes the network security processor support program which is the interface between the network security processor 13 and the host computer 11. The network security processor 13 is a small computer which may embody personal computer architecture. Processor 13 may have a display 15, as well as an IC card read write unit 17, according to the invention, and an IC card 19 embodying the invention. Processor 13 operates to provide the interface for the host computer requests for cryptographic and other security functions and directs the requests to an internal cryptographic adapter card 29.

Communication between host computer 11 and work stations is provided by either direct attach or through a communications concentrator 21. Concentrator 21 is in turn connected to one or more work stations 23 and 25 which may operate together on a local area network. Each workstation will have a keyboard and display and optionally may have a card read write unit 17 for reading and writing information to an IC card 19. In addition, reader 17 may have a signature verification pen 27 for use in capturing the acceleration and pressure dynamics while a holder of card 19 is signing a signature. Processor 13 and work stations 23, 25 may also have a cryptographic adapter card 29 installed into their computer bus. Card 29 has thereon a shielded module 31 which is secure from physical and electrical attempts to read or modify information stored in the memory in module 31.

Each device has the capability to establish a secure session with any of the other devices, or with a remote device which is capable of supporting the secure session establishment protocol. In order for two devices to establish a secure session, they must each contain an identical key encrypting key. This requirement guarantees that unauthorized devices cannot establish secure sessions with each other. A result of the secure session process is the establishment of a randomly derived cryptographic session key known to both devices. Neither the session key nor any other secret data is divulged on the interface between the devices during the session establishment process.

Multiple configurations of system security component devices at the intelligent workstation (IWS) are considered in the system of the invention.

The IWS may utilize only the cryptographic adapter card 29, into which user authorization profiles are downloaded from the host computer and in which high-speed cryptographic functions such as application program encryption are performed. User identification in such an IWS would be accomplished via password entry at the IWS keyboard.

An IWS, utilized primarily in an off-line environment, may have only the IC card read/write unit and the IC card. In this configuration, user identification is effected by entering a PIN on the read/write unit, verification taking place within the user's IC card. The user's authorization profile may be used to control functions performed in the IC card or may be downloaded into the IC card read/write unit to control its functions.

A third configuration, comprising the cryptographic adapter 29, the IC card read/write unit and the IC card, provides all of the functions of the first two configurations. Additionally, it allows the user's authorization profile to be downloaded from the IC card to the cryptographic adapter. A fourth IWS configuration adds to the third configuration the signature verification pen 37, attached to the read/write unit, thereby providing user verification either via PIN or signature dynamics.

Figure 2:
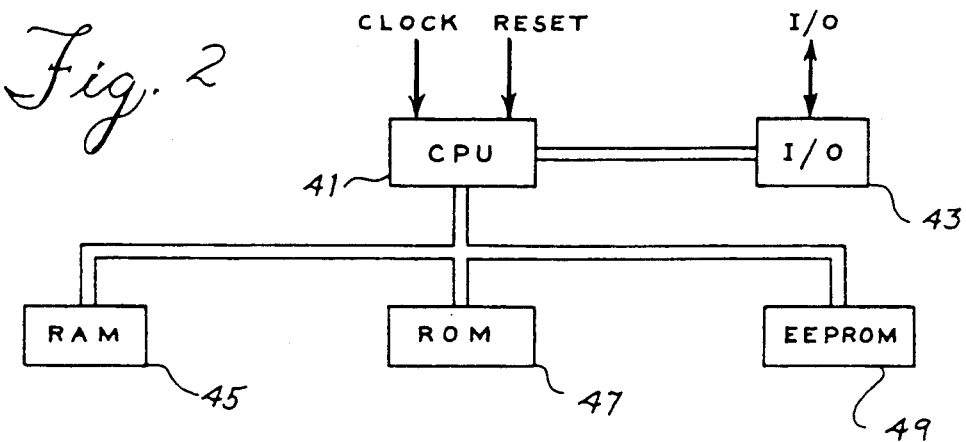
FIG. 2 is a more detailed block diagram of the IC card of the invention.

FIG. 2 is a more detailed block diagram of the electrical circuits of IC card 19. In FIG. 2, the central processing unit 41 communicates via physical contact with card reader 17 through input/output circuits 43. Connected to the computer bus, CPU 41 is random access memory 45, read/only memory 47 and electrically erasable, programmable read/only memory 49.

A number of requests to the IC card require a boolean response, in which the response can have only one of two values. For the purposes of this description, the two values are referred to as TRUE and FALSE. A secure method is used by the programs in the IC card of FIG. 2 to communicate this response.

The method has two very desirable attributes: First, the response is kept secret. Even if the response data is read from the IC card interface, the boolean value of the message cannot be determined. Secondly, if the message is tampered with, as by an adversary who intercepts the message and inserts his own replacement, the act will be detected.

The response is secured through the following cryptographic operation:

1. The requestor generates an eight byte random number, encrypts it under the session key, and sends it to the IC card as part of the request message.
2. The IC card decrypts the random number. If the response value is TRUE, the random number is incremented by one. If the response value is FALSE, the random number is instead incremented by two.
3. The smart card re-encrypts the incremented number under the session key and sends it in the data field of the response message.
4. The requestor decrypts the data, and compares it with the random number he originally sent. If the number is one greater than his original random number, the response is TRUE. If the number is two greater, the response is FALSE. If the number has any other value, the response has been tampered with and is invalid.

Thus, we have accomplished the two goals stated above. The response is secret and cannot be determined by tapping the communications interface, and any attempt to alter the response can be detected.

The random number generator programmed into the IC card uses an 8-byte counter to create different output values each time the algorithm is called. The counter itself is not the random number; it is simply one variable, and is the one used to cause a different value to appear each time.

The counter is in the secure environment of the EEPROM on the IC card, where its value cannot be seen by the user. Thus, it is not important that the counter actually count upward in the conventional sense. What is really important is that it change each time a new random number is generated, and that it step through a very large number of states. Two to the sixty fourth power is the optimal case for a 64 bit counter, but other very large numbers of states are also acceptable under most circumstances.

The EEPROM is nonvolatile, so the counter value is maintained even when the device is powered off. There is one significant problem with EEPROM, however in that each memory cell gradually degrades each time it is written, and will eventually fail, for example, after being rewritten 10,000 times.

If we implement a simple counter, the low order bit changes each time the count is incremented. Thus we would only be guaranteed 10,000 counts before the device failed. This clearly does not meet the needs of the random number generator.

The improved method of this invention gives more possible values of the counter before the EEPROM fails. The improved method has a disadvantage in that it does not guarantee all counter values will be different, but it will generate many different values, in a way that cannot be determined from outside the secure environment. It also results in significantly more than the 10,000 cycles possible with the straightforward counter.

The method used updates the counter in a way which will maximize its life. For the EEPROM, this means trying to update each cell of the EEPROM equally often, so all cells will age at an equal rate. This is different from the simple counter, in which low order bits are always updated more frequently than higher order bits.

The method uses the random number itself to index to one of the 64 bits in the counter, then toggles (complements) that bit. The bits of the counter are numbered 0-63, where bit 0 is the low order bit and 63 is the high order bit. The low order 6 bits of the random number are interpreted as a value between 0 and 63, and are used to select the corresponding bit of the counter, which is then toggled. Since the random number generator produces a uniform distribution of values, the 64 bits of the counter are each selected an equal number of times, and none are written more often than any others. Consider the following simplified example, showing a 16-bit counter and the lower 4 bits of the random number.

| Counter | Random Number bits |
| --- | --- |
| 0000000000000000 (0) | 1100 (bit 12) |
| 0001000000000000 (4096) | 0101 (bit 5) |
| 0001000000100000 (4128) | 1011 (bit 11) |
| 0001100000100000 (6176) | 0000 (bit 0) |
| 0001100000100001 (6177) | 0111 (bit 7) |
| 0001100010100001 (6305) | .... |

Eventually, if the random number values are truly random, the counter would take on all two to the sixty fourth values. It is unlikely that this will happen in reality, but the majority of the values will be attained.

Ideally, the EEPROM would allow toggling of individual bits so that each counter update would result in only one of the 64 bits being written. In most real EEPROMs, however, the smallest unit that can be written is a byte. Thus, when any bit is toggled, the entire byte containing that bit will be written. The result of this is that each of the eight bytes are written ⅛ of the time. The lifetime of the counter is then 8 times 10,000, or 80,000 counts, rather than the 10,000 possible with a straightforward counter.

Figure 3:
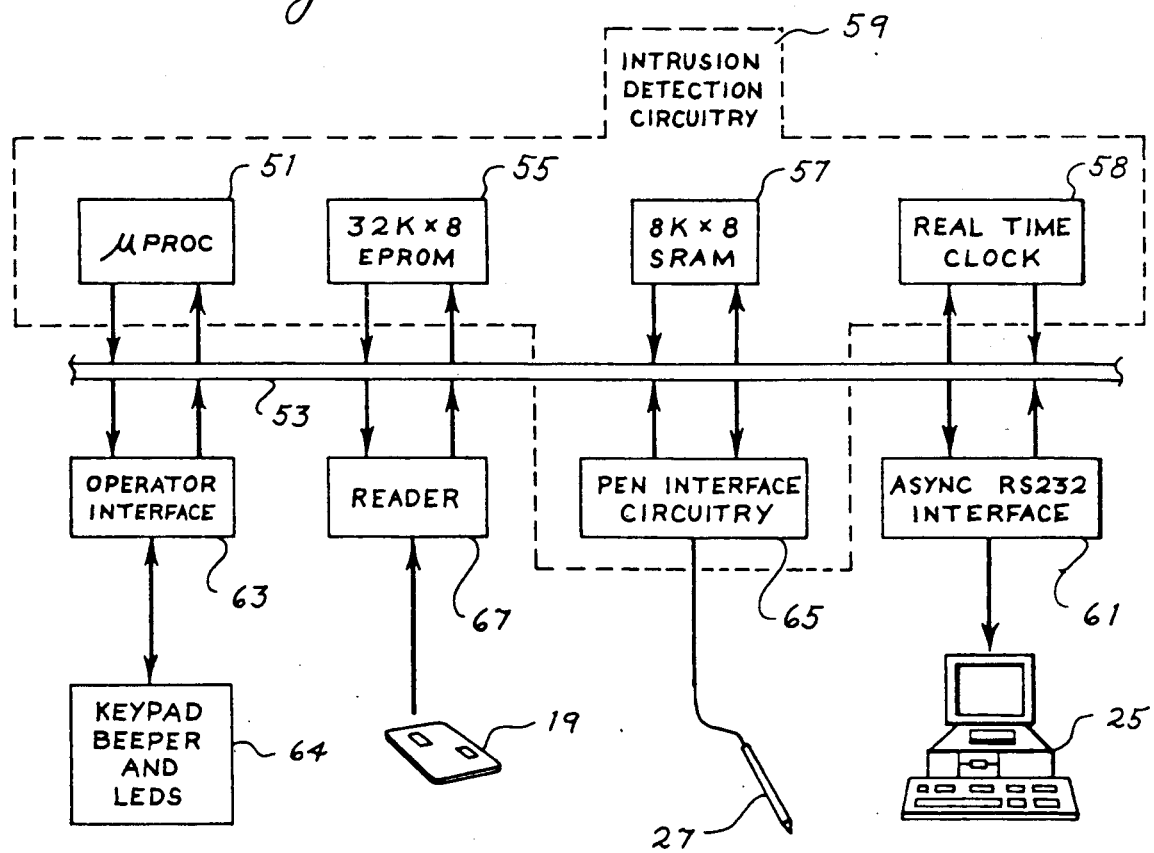
FIG. 3 is a block diagram of the circuits of the IC card read write unit.

FIG. 3 shows a block diagram of the circuitry embodied in card reader 17. The computational heart of card reader 17 is microprocessor 51, connected to a bus 53 for communication with other elements of the card reader. Memory for microprocessor 51 is provided in the form of electrically programmable read/only memory 55 and static random access memory 57. Blocks 51, 55, 57, 59 and 65 are enclosed in a secure shielded module with intrusion detection circuitry 59 in order to protect the content thereof. Intrusion detection circuitry is shown, by way of example, in patent application 07/405910 of common assignee with this application.

In addition to memory, microprocessor 51 is served by real time clock 59. Processor 51 interacts with other devices and the operator, using the following blocks. Communication with the secure cryptographic adapter card 29 in a workstation 25 (or a network security processor 13) and with the standard RS-232 port of a workstation 25 is through asynchronous RS-232 interface 61. The primary communication between card reader 17 and an operator is through operator interface 63 which includes a keypad, an audible beeper, and light emitting diodes. In addition to those operator interface features, the card reader 17 supports a signature pen interface for receiving signals representing the signature of a holder of IC card 19 who wishes to obtain services authorized to the genuine holder of card 19. Pen interface circuitry 65 provides the input ports for receiving change of pressure and acceleration signals representing the signature of the person holding the card. This circuitry and supporting programs are defined in more detail in U.S. Pat. Nos. 3,983,535; 4,128,829; 4,553,258; 4,724,542; 4,736,445; and 4,789,934, of common assignee with this application.

The IC card 19 itself is read by circuits 67 which include physical and electrical contacts for connecting the circuitry of FIG. 2 to the bus 53 so that computer microprocessor 51 can act in conjunction with the computer 41 in the card under security programs to transfer information between the card reader and the card.

Figure 4:
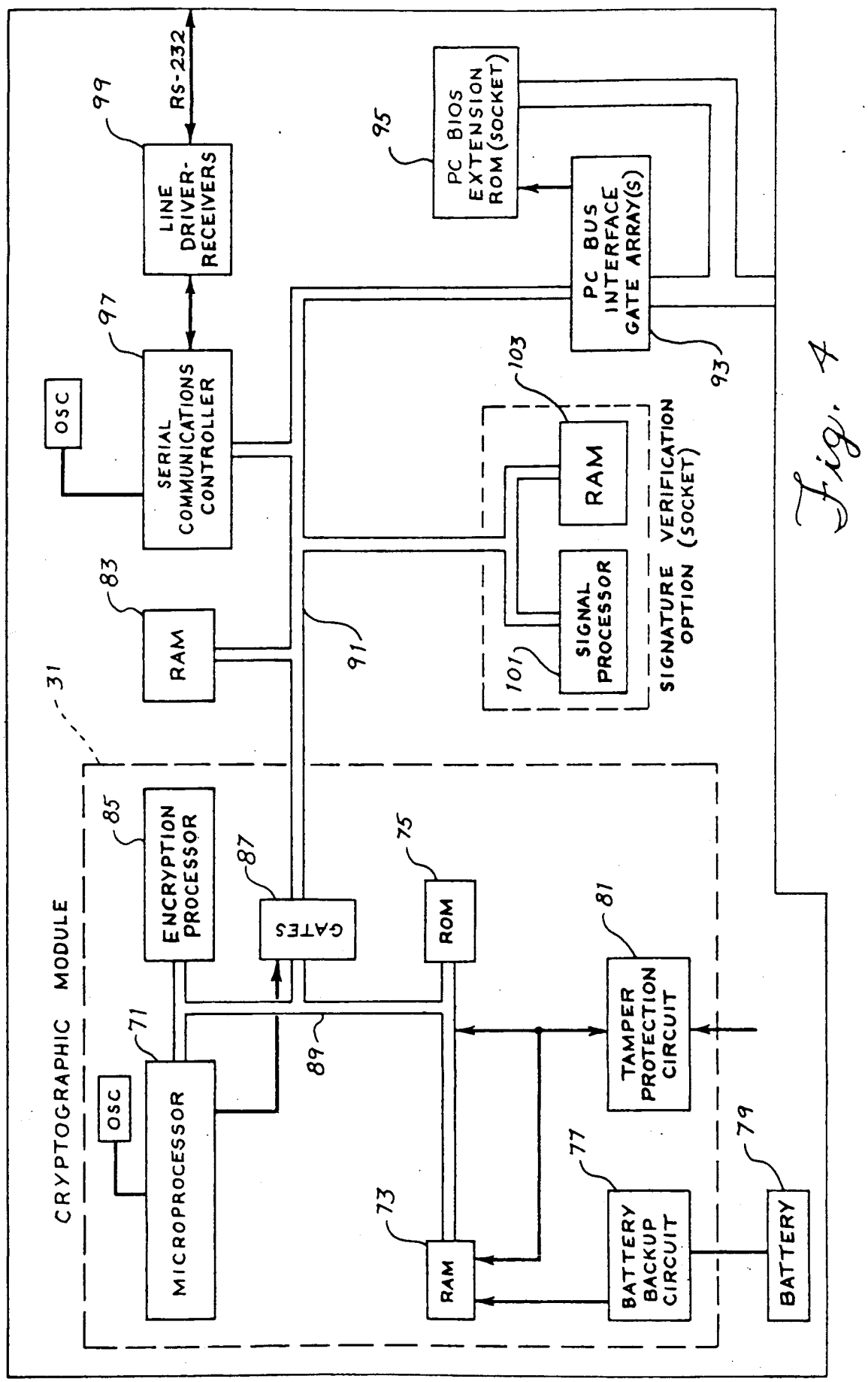
FIG. 4 is a block diagram of the circuits of the cryptographic adapter card.

Referring now to FIG. 4 where the block diagram of the circuits of the cryptographic adapter card 29 are shown, there follows a brief description of each block. The heart of cryptographic adapter 29 is the cryptographic module 31 which provides a tamperproof environment for the encryption processor and storage which contains the cryptographic keys. The cryptographic adapter is controlled by microprocessor 71, using secure memories in the form of random access memory 73 and read/only memory 75. The cryptographic keys are stored in random access memory 73 which is kept active by battery backup circuit 77 and battery 79. In order to thwart an attack on the secure module, battery backup circuit 77 operates under control of tamper protection and detection circuit 81 which detects any attempt to access module 31 by physically attack. The physical and electrical protection of module 31 is set out in greater detail in patent application Ser. No. 07/405910, of common assignee with this application. Microprocessor 71 uses random access memory 83 which is located outside of the secure module 31, in addition to its secure memory. To prevent access to the contents of secure memory 73 and 75 while microprocessor 71 or encryption processor 85 is forming a secure process, gate 87 opens the connection of bus 89 to its outside extension 91 so that any information on bus 89 cannot be read from outside of module 31 at contacts connecting bus 91.

Figure 5:
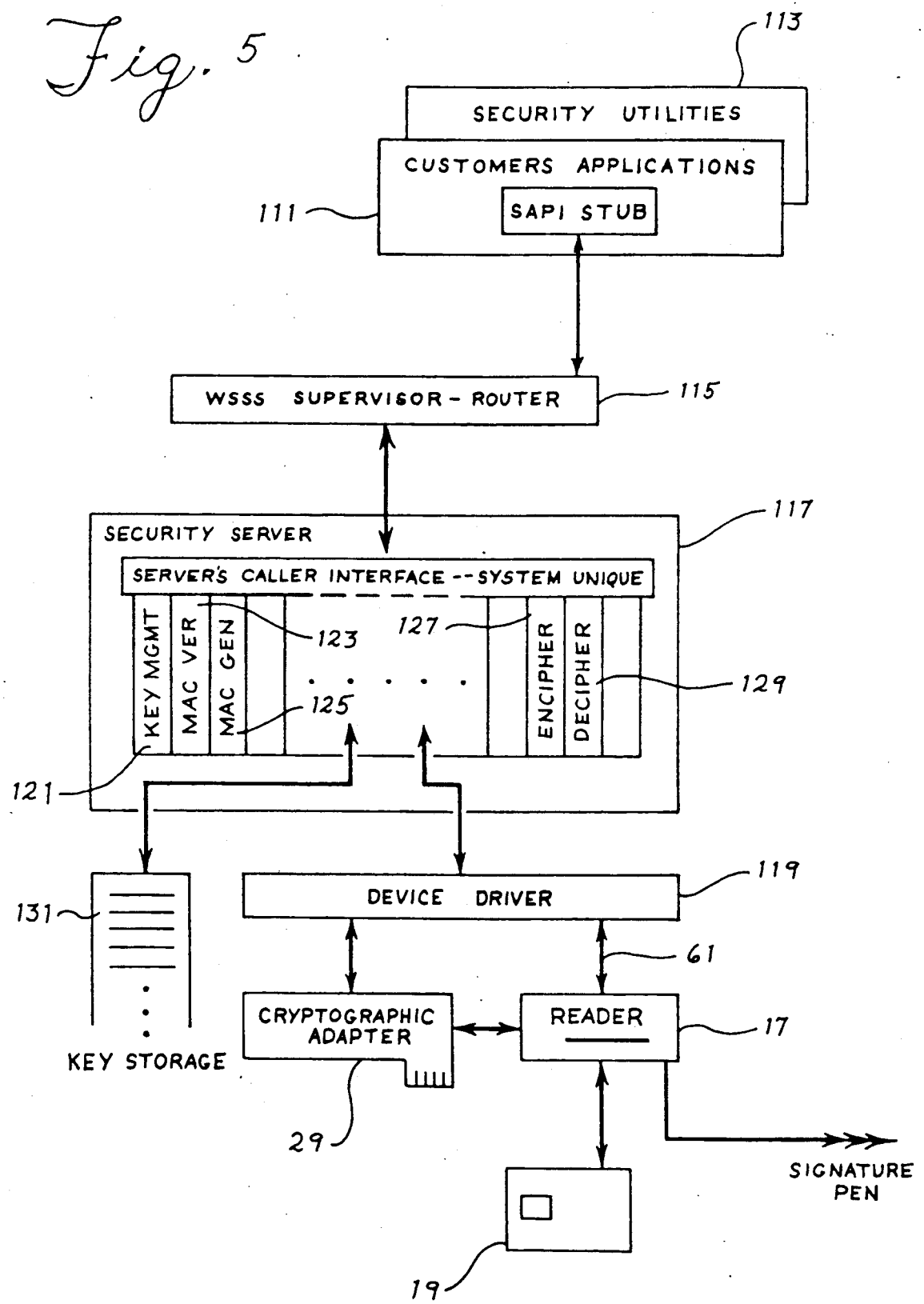
FIG. 5 is a block diagram of the software and hardware security components in a workstation.

Turning now to FIG. 5, a block diagram of the hardware and software features of a workstation 23 or 25 are shown. A customer application program 111 runs in a workstation 23 or 25, utilizing security utilities 113 and interfaces with the operating system program in the workstation, using a security application program interface. The security utilities provide for such functions as initializing an IC card 19 or enrolling the reference signatures of a user into the memory of the card. Cryptographic function requests from a customer application program 111 are passed through workstation security service supervisor and router 115 to the security server program 117. Security server program 117 provides the program modules and information, including cryptographic keys needed to perform a specific function, to the cryptographic adapter hardware 29 through a device driver program 119. Example program modules include key management module 121, message authentication code verification 123, message authentication code generator 125, and encypher/decypher functions 127, 129.

The keys used for generation of message authentication codes, encrypting of other keys, and ordinary encryption and decryption tasks can be stored in many places in the secure network. Keys are stored on PC disk memory in encrypted form, encrypted under the master key of one of the security devices, cryptographic adapter 29, card reader 17, or IC card 19. Keys are also stored in the nonvolatile memories of cryptographic adapter 29, card reader 17, and IC card 19.

In those configurations where a workstation has both a cryptographic adapter 29 and an IC card reader 17, security functions relating to the IC card or card reader are requested by customer application program 111, pass down through the various program interfaces through cryptographic adapter 29 to card reader 17. In those configurations where a workstation has only a card reader and no cryptographic adapter, the card reader is connected to the personal computer of the workstation by asynchronous communication interface 61, shown in FIG. 3, which is represented as a communication line in FIG. 5.

Figure 6:
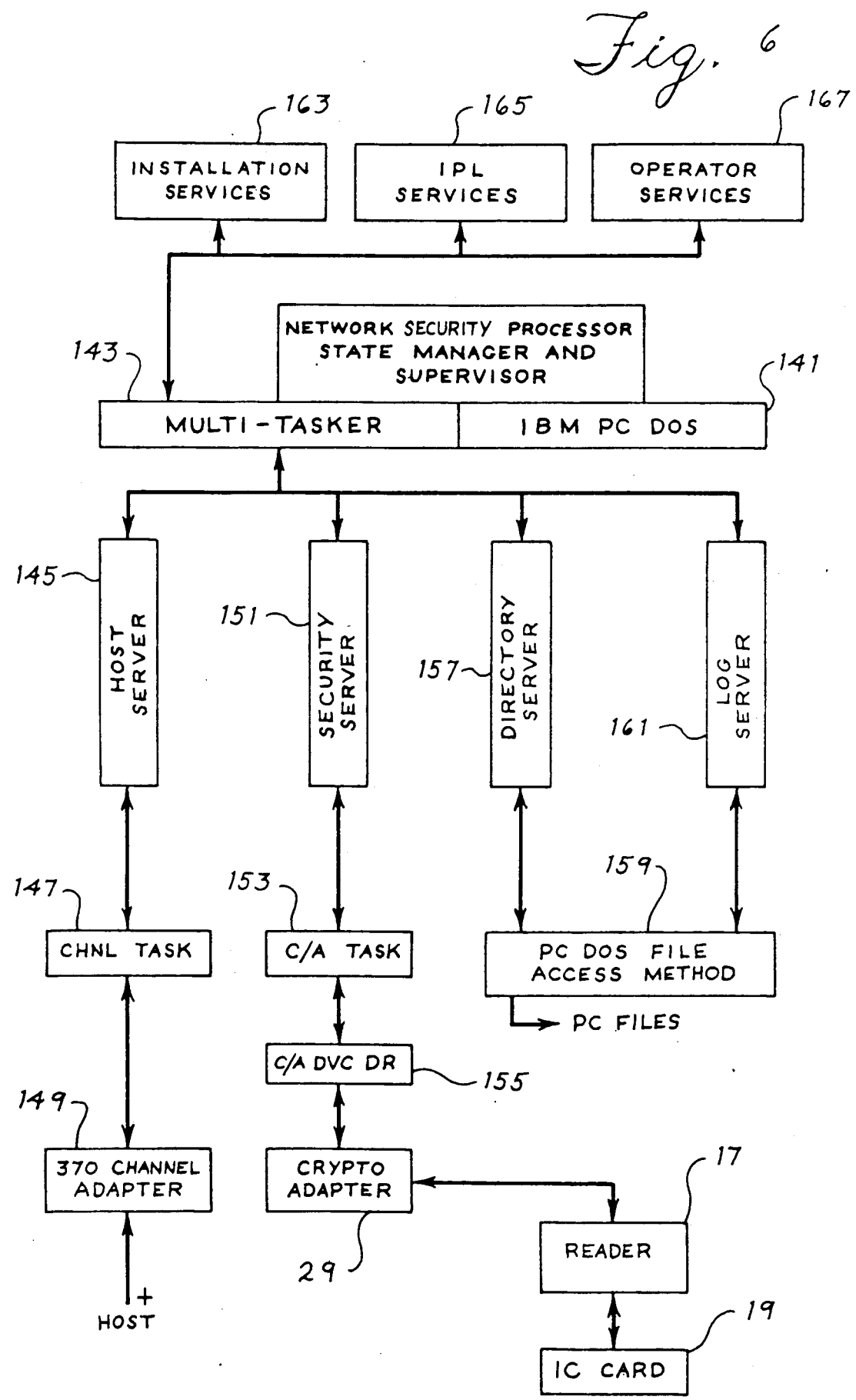
FIG. 6 is a block diagram of the software and hardware security components of the security processor.

Referring now to FIG. 6, a more detailed block diagram of the circuits and programmed functions, residing in network security processor 13, are shown. Network security processor 13 is based upon a personal computer architecture running a special security operating system which prevents the computer from performing ordinary personal computer functions, thereby enhancing security. The security operating system is based upon an IBM Personal Computer Disk Operating System 141 and modified by a multi-tasking program 143. One of the tasks running under multi-tasking program 143 is a host server module 145. Server 145 manages the communications between the network security processor 13 and the host computer 11 through a channel task program 147 and a host channel adapter 149. Of particular importance is another task in the form of security server program 151, performing functions complementary to the security functions performed by the security server 117 in the workstation shown in FIG. 5. This is accomplished by the cryptographic adapter task program 153 and cryptographic adapter device driver program 155 which provide the interface to a cryptographic adapter 29, installed in the personal computer bus of network security processor 13. The IC card reader 17 and its associated IC card 19, attached to the network security processor 13, are used to control access to the network security processor for initializing the security processor, operator services, and maintenance etc. Another function served by the card reader is to accept parts of master keys in secure fashion in order to initialize the security processor. That, after the master key entered in parts, is used to generate other keys for distribution to other devices at other nodes in the secure network.

The directory server task 157 contains the pointers and program routines to allow the security server to access encryption keys and other information needed to perform its cryptographic functions, interfacing with PC DOS file access method programs 159. Log server 161 also is a task which provides for the auditing functions needed by the system. At the top of FIG. 6 are shown blocks 163 which provides installation services programming, 165 which provides initial program loading services, and 167 which provides operator interface programmed functions.

Figure 7:
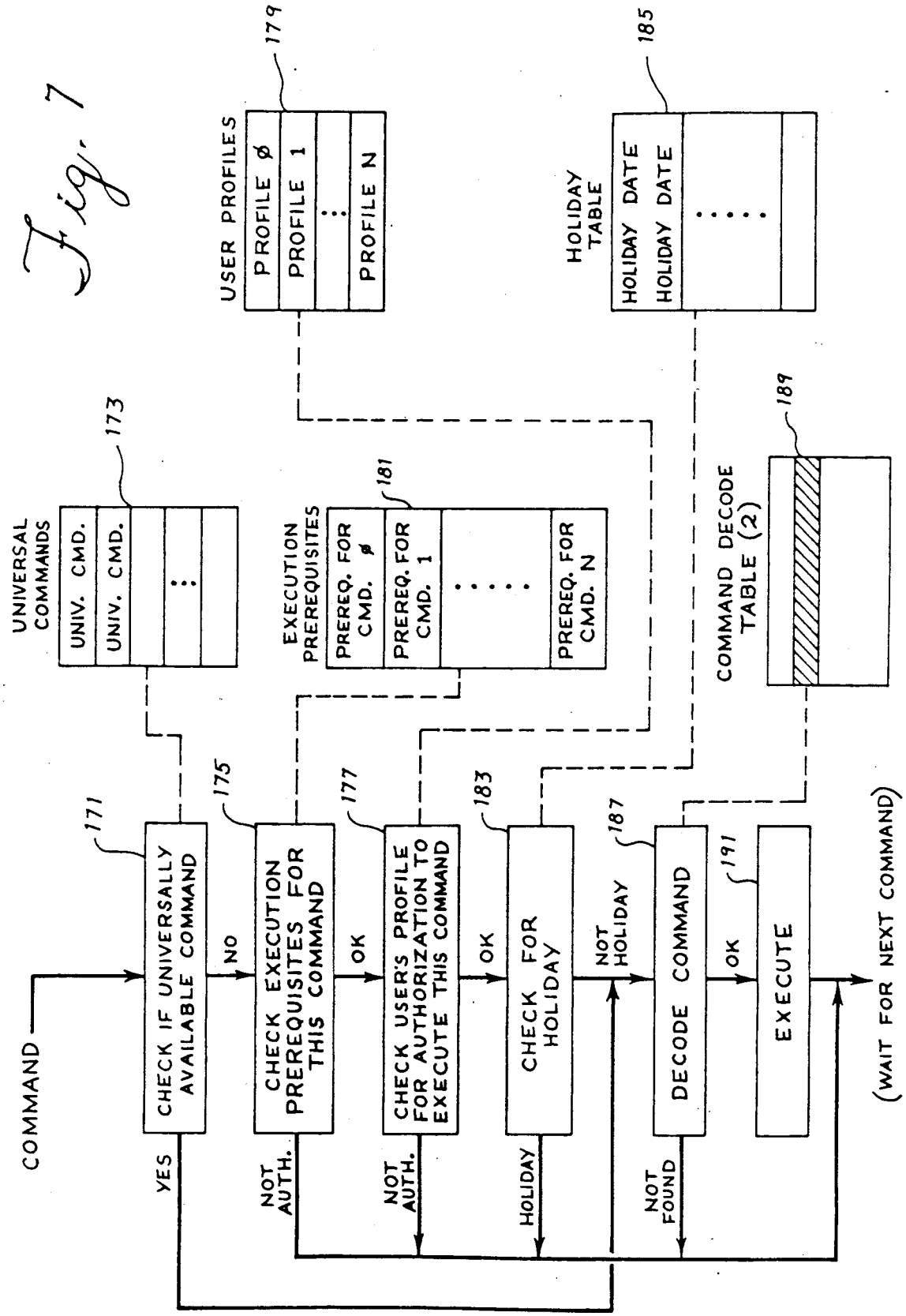
FIG. 7 is a high level flow diagram of authorization checking to execute a command.

FIG. 7 is a high level view of the processing method which decides whether a user is authorized to execute a particular command. Each test references one or more tables, which are shown attached to the corresponding processing step.

The first step 171 checks whether the command is a universally authorized command. Universally authorized commands listed in table 173 are a fixed, predefined set of commands that are necessary for all users in all situations. They are always allowed, regardless of the user's authority. None of these commands are security-related.

The next two steps 175 and 177 are actually performed together, but are shown separately for clarity. These involve checking whether the current user is authorized to execute the particular requested command. A user's authority is defined by the contents of a related user profile in the table of user profiles 179. The requirements for execution of the selected command are defined in command configuration data table 181 by the execution prerequisites for that command. These two items of information from the tables are examined to determine if the user is permitted to execute the command. These steps are set out in more detail in FIG. 9.

If the user has the authority to execute the selected command, there is one additional step 183 that still must be performed. A programmable table 185 contains a list of dates defined as holidays, and most commands cannot be executed on a holiday. This provides an additional level of security. If the current date is listed as a holiday, all commands except the universally authorized commands are disallowed.

Figure 10:
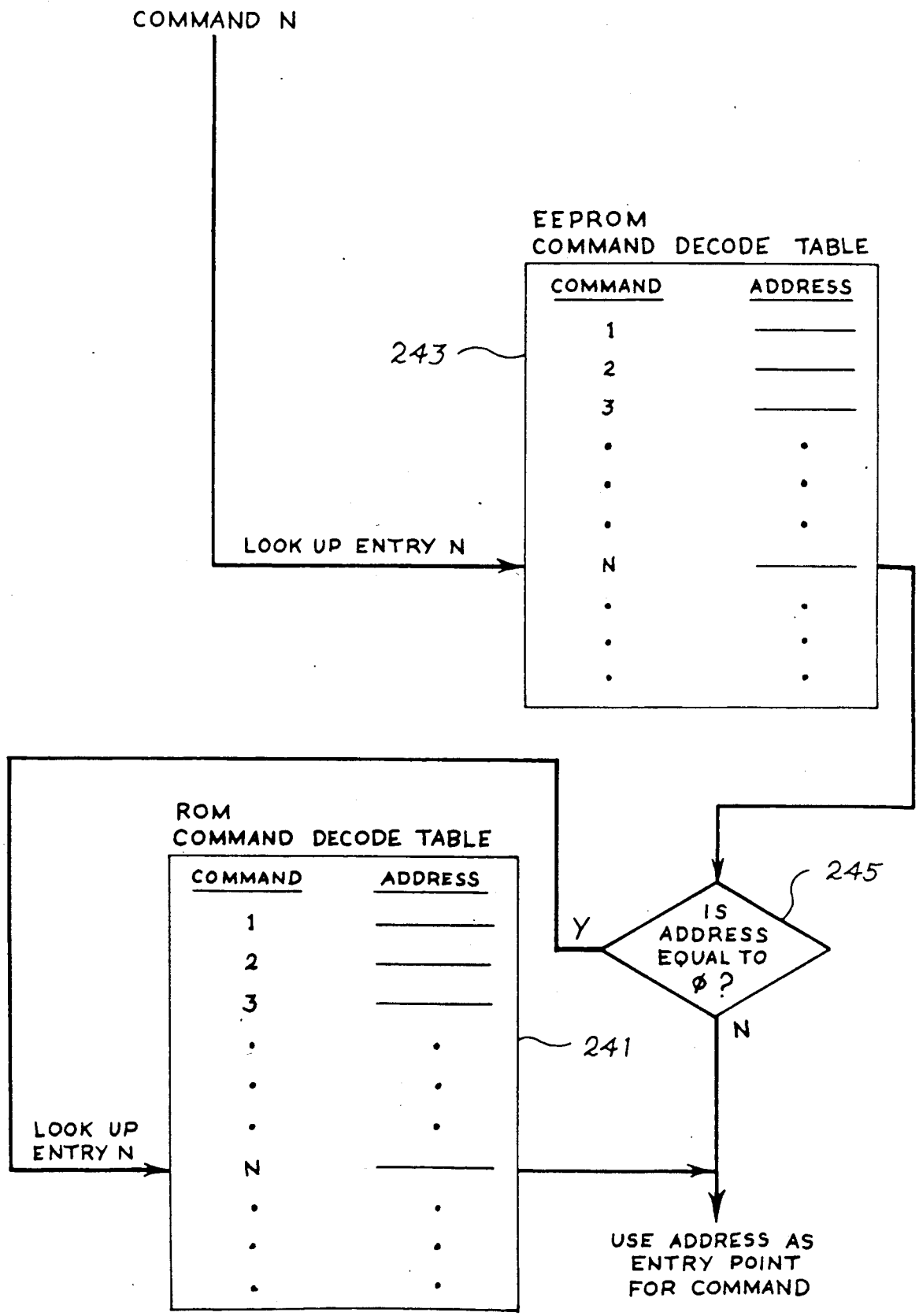
FIG. 10 is a command decode flow diagram.

Once it has been determined that the user is authorized to execute a command, the command is decoded at block 187, using the command decode tables 189 shown in more detail in FIG. 10. The command is executed at block 191 of the flow diagram, after which control of the IC card or other security device returns to wait for the next command.

Figure 8:
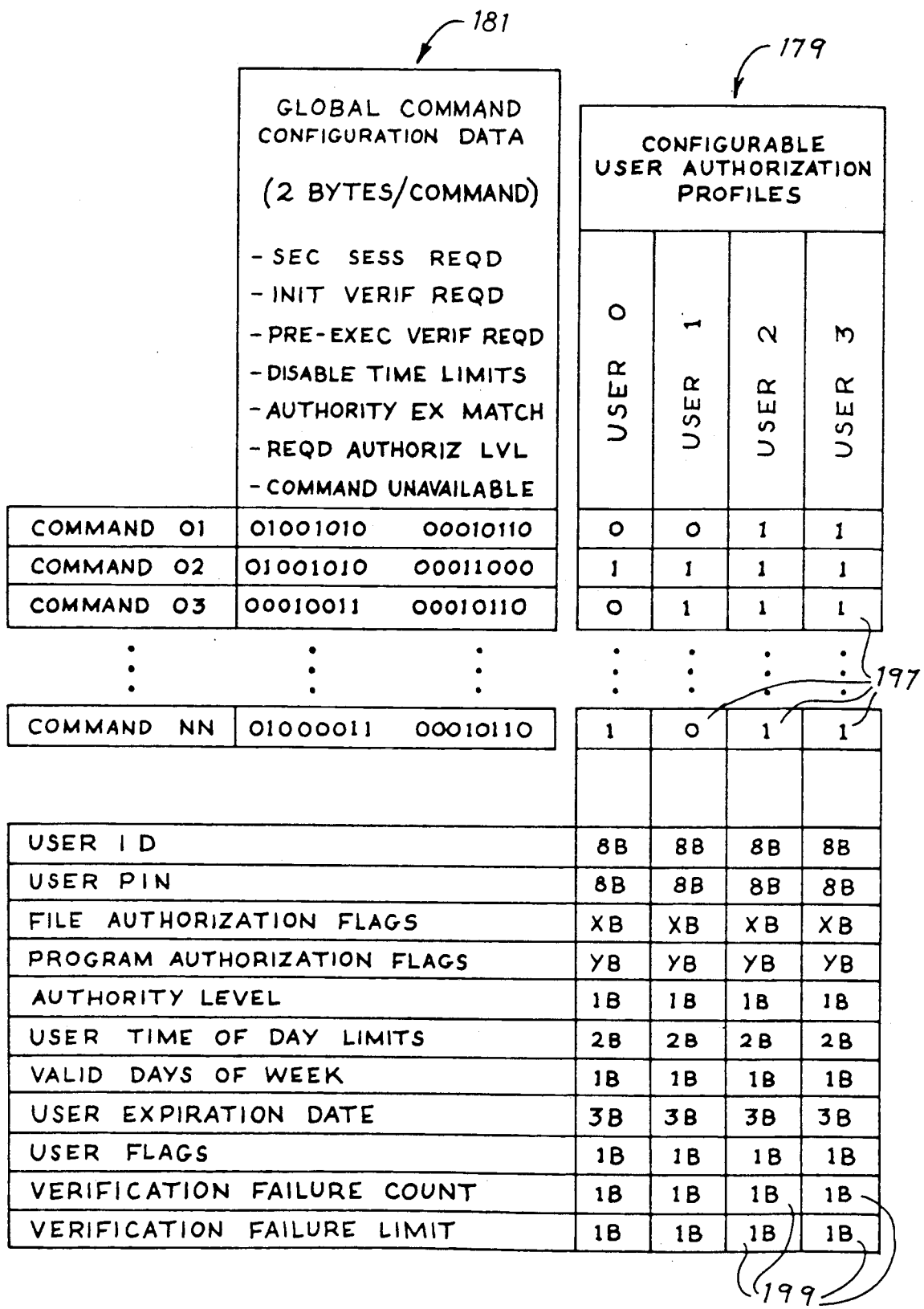
FIG. 8 shows content of the user profile and command configuration data tables.

FIG. 8 represents the relationship between user authorization profiles 179 and command configuration data 181, as they are utilized within the IC card to securely limit the use of commands, as programmed by a designated authority of the application owner.

Each of the user authorization profiles 179 contains a command authorization flag bit 197 for each command used in any of the system security devices. If the flag bit is not set, then the user is not authorized to execute the corresponding command.

User authorization profiles 179 also contain some number of file and program authorization flags 199. When the user profile is downloaded into a workstation cryptographic adapter, each file authorization flag bit is associated with a cryptographic data key used for encrypting or decrypting a specific file. Similarly, the program authorization flag is used to control access to specific programs.

Other data 199, in the user authorization profiles 179, specify a level of authority in the exercise of commands, time of day and day of the week limits, expiration date for the user authorization, and other user flags indicating the mode for the identification of the user.

The command configuration data 181 is independent of the user authorization profile, but consists of a number of prerequisite conditions and authorizations for each command. There is a unique set of command configuration data for each of the system security devices in the system.

Figure 9A:
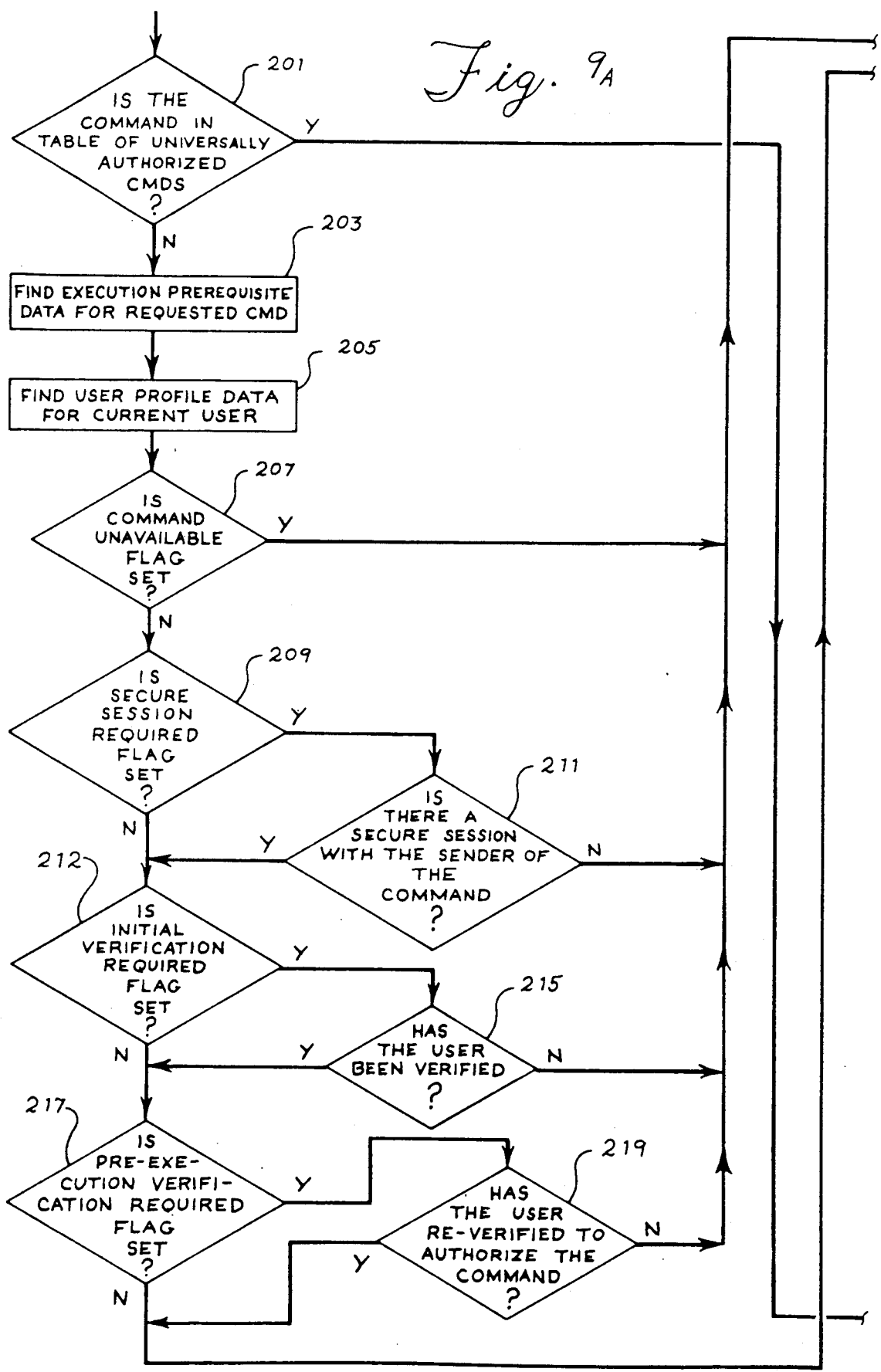

FIG. 9 is a detailed flowchart showing exactly how the authorization checking of FIG. 7 is performed. The first step 201, as in FIG. 7, is to check the table 173 of universally authorized commands. If the command is in this table 173, remaining steps are bypassed and the command is automatically authorized.

At block 203, the user's user profile 179 is retrieved and, at block 205, the command configuration data 181 for the selected command is retrieved. These are used in performing most of the remaining checks. If the command unavailable flag is found, at block 207, to be set in the command configuration data 181, the command is not authorized and the remaining steps are bypassed.

If the secure session required flag is found at step 209 to be set in the command configuration data 181, the command is not authorized unless a secure session is determined at block 211 to be in effect with the sender of the command. This has the effect of allowing the command only if the sender of the command has been verified as an authentic system component or device as for example, an IC card or cryptographic adapter etc. A secure session cannot be established between two components that do not share certain common cryptographic keys installed by the owner.

If block 213 determines that the initial verification required flag is set in the command configuration data 181, the user must have verified his identity at some time during the current session, or the command will not be allowed. This is tested at block 215. He may have verified his identity by entering his PIN, or by using signature verification, or some other external means. The methods he can use for verification are controlled by the verification method identifier in his user profile.

If the pre-execution verification required flag is set (block 217) in the command configuration data 181, the user must re-verify his identity before each time the command is executed. Block 219 tests whether the user has re-verified his identity in order to use this command. If this flag is set and the user has not re-verified for execution of the command, it will not be allowed.

Block 221 determines if the disable time limits flag is set in the command configuration data 181. If it is set, the time of day, date, and day of week checking at block 223 is bypassed for the command. If the flag is not set, the time of day limits, expiration date, and valid days of week fields in the user profile are compared to the current time, date, and day of week to determine if the command is allowed. If any of these are not satisfied, the command is not allowed and further checks are bypassed.

If the current date is found at block 225 to be listed as a holiday in the programmable holiday table, the command is not allowed. The user's authority level in his user profile is compared at blocks 227. 229 and 231 to the authority level required to authorize the selected command, which is contained in the required authority level field of the command configuration data 181. If the authority exact match flag is set in the command configuration data, the user's authority level must be exactly equal to the required authority level for the command to be allowed. If the authority exact match flag is not set, the user's authority level must be greater than or equal to the required authority level for the command to be allowed.

Each user's user profile contains a set of command authorization flags defining which commands that user is excluded from executing. If the requested command is not authorized in the user's command authorization flags, execution is not allowed by the logic in block 233.

Each user's user profile contains a verification failure count which counts the number of consecutive verification faliures, either by PIN or by signature verification, or another external means. Each profile also contains a programmable verification failure limit, defining the number of consecutive verification failures the user is permitted before he is locked out. At block 235, the user's verification failure count is checked to see if it is greater than or equal to his verification failure limit, and if so, the command is not allowed.

Referring to FIG. 10, the method of command decoding in the IC card is shown. This method employs two command decoding tables: one 241 in the microprocessor ROM. which is fixed, and another 243 in the electrically erasable programmable read only memory (EEPROM). which is programmable. The table 241 in ROM defines the default subroutine address to be called for each of the possible commands. The table 243 in EEPROM can be loaded with new addresses, which will override those in the ROM table. The method allows one to load new commands into EEPROM. or to load replacements for commands in the ROM, and to use the EEPROM table to cause these downloaded commands to be executed in place of the commands in the ROM. Whenever a command is to be executed, the address is first read from table 245 in EEPROM. If block 245 in FIG. 10 determines that the address from the table 243 is not zero, it is used as the address of the subroutine to process the requested command. If the address is zero, an address is read from the table 241 in ROM and the address read from ROM is used for the subroutine to process the command. Thus, any ROM command subroutine can be replaced by inserting a non-zero address into the table 243 in EEPROM.

Figure 11:
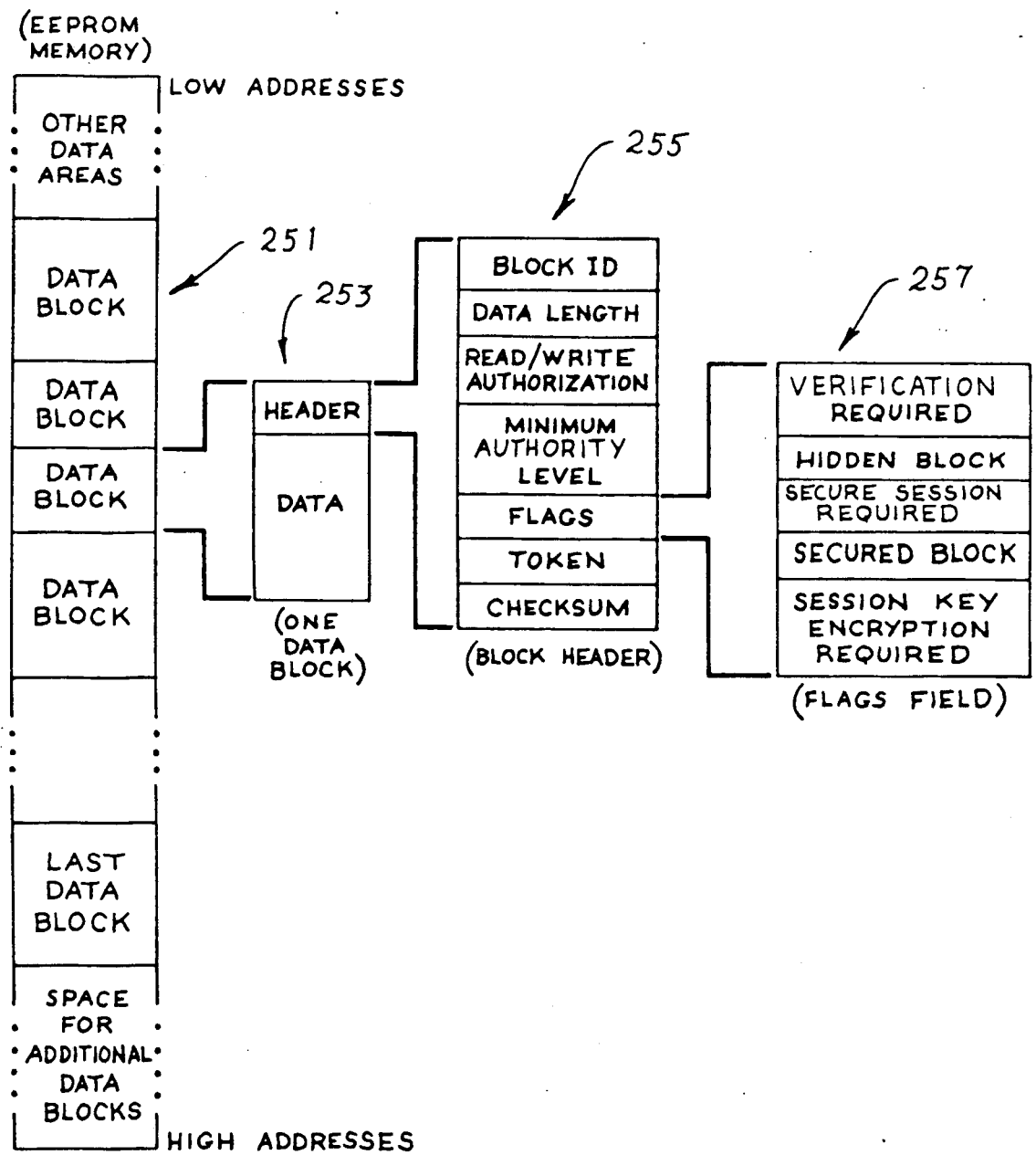
FIG. 11 shows the structure of data blocks in the memory of the IC card, according to the invention.

FIG. 11 shows the format used on the IC card to store data blocks. Data blocks are a general purpose means for defining and managing user or system data areas in the IC card non-volatile memory. Data is written to the blocks and read from the blocks. There are many options and features to keep the data secure from attacks.

251 in FIG. 10 shows the overall layout of data blocks in the IC card EEPROM memory. The low portion of the memory is reserved for information that is not related to the data blocks. All memory above this fixed, predefined data is available for the definition of data blocks. They are allocated in contiguous segments of the memory. The first data block defined occupies memory starting immediately after the fixed data, the second block defined immediately follows the first, and so on.

253 shows the structure of a single data block. Each block consists of two parts, a header and a data area. The header contains control information related to the block, and the data area contains the data which is written to and read from the block. The information in the header is defined when the block is allocated. The data area is of a fixed size once the block has been defined by the one of the users.

255 shows the contents of the block header. The block ID is an eight byte field used to identify the block. It is passed to the card with all data block commands in order to identify the block of interest. Any eight byte value is permitted. The token is a secret value used to authorize access to the data in the block. The user must pass the correct token to the IC card with each data block command in order to be granted access to the block. The token is similar to a password for access to the block. It is defined by the user at the time the block is allocated. In order to protect the block ID and token from disclosure, they can be encrypted under the session key when they are transmitted to the IC card.

The data length field in 255 defines the number of 8-byte paragraphs in the data area of the block. A value of 1 indicates that there are 8 bytes in the data area, a value of 2 indicates there are 16 bytes, and so on.

A checksum is stored in the header 255 to allow verification of data integrity in the data portion of the block. The checksum is calculated from the data each time it is written, and the checksum is verified each time the data is read. If the checksum indicates there is an error in the data read, the data is still returned to the requester, but a warning code is returned to inform the requester of the error condition.

The header 255 contains read authorization flags and write authorization flags for each user profile. Each of the possible IC card users can be given read only access, write only access, read/write access, or no access to each data block individually.

The header also contains a minimum authority level which is compared with the authority level in the user's profile. The user's authority level must be greater than or equal to the minimum authority level in the block header in order for that user to be granted access to the block.

A set of flags 257 in the block header 255 defines various security features for the block. The verification required flag, if set, indicates that the user must have verified his identity before he can be granted access to the block. The user can verify his identity with PIN or with signature verification or another external verification means. A hidden block flag, if set, indicates that the block will not be listed when the user requests a list of the blocks that exist on the IC card.

A secure session required flag, if set in 257, indicates that the block cannot be accessed from a device unless that device has a secure session in effect with the IC card. A session key encryption required flag, if set in 257, indicates that all data transmitted to the card for writing in the block, or transmitted from the card when read from the block, will be encrypted using the session key established between the IC card and the device with which the secure session has been established.

If the secured block flag in 257 is set, the block token must be passed to the IC card encrypted under a cryptographic key. The IC card will decrypt the token using the specified key, and compare the decrypted result with the token stored in the block header 255. Access to the block will be denied unless the decrypted token is correct. This ensures that the block can only be accessed if the requester knows the correct token, and possesses the correct cryptographic key. This has the effect of protecting the data from either read or write access unless the requester knows the correct secret key.

A typical method for protecting data using encryption is to encrypt the data itself when it is stored. The correct key must be used when it is read back and decrypted in order to retrieve meaningful data. This protects against reading by those who do not possess the secret key. It has two disadvantages, however. First, it requires the overhead of encrypting and decrypting the data, which can be time consuming for large data blocks. Secondly, it only protects the read operation. The data can still be overwritten by someone who does not possess the key, although the data written might not be meaningful.

The secured block concept employed in the IC card described here is a superior alternative to simple encryption of the data in the block. It requires far less encryption overhead, and also protects both reading and writing of the data block. The method encrypts the block token when it is sent to the IC card, rather than encrypting the data itself. The IC card decrypts the token, and if the user does not possess the correct cryptographic key, the IC card will recover a token value that does not match the token stored in the block header. Access to the block, either in read or write mode, will then be denied. Only encryption of the eight byte token is required.

Note that storing the data in encrypted form is not required in the IC card. The data is stored in the EEPROM. which is a secure environment. The only need for encryption of the data is when it must be protected as it passes over the interface to the IC card. For that purpose, the IC card can accept data encrypted under the session key for the write operation, and can encrypt outgoing data under the session key for the read operation.

A summary of the classes of default commands that can be executed by the security component devices is shown FIG. 12. In the IC card, for example, additional and different commands can be downloaded to the IC card device in order to perform additional functions as they are found to be needed.

Figure 13:
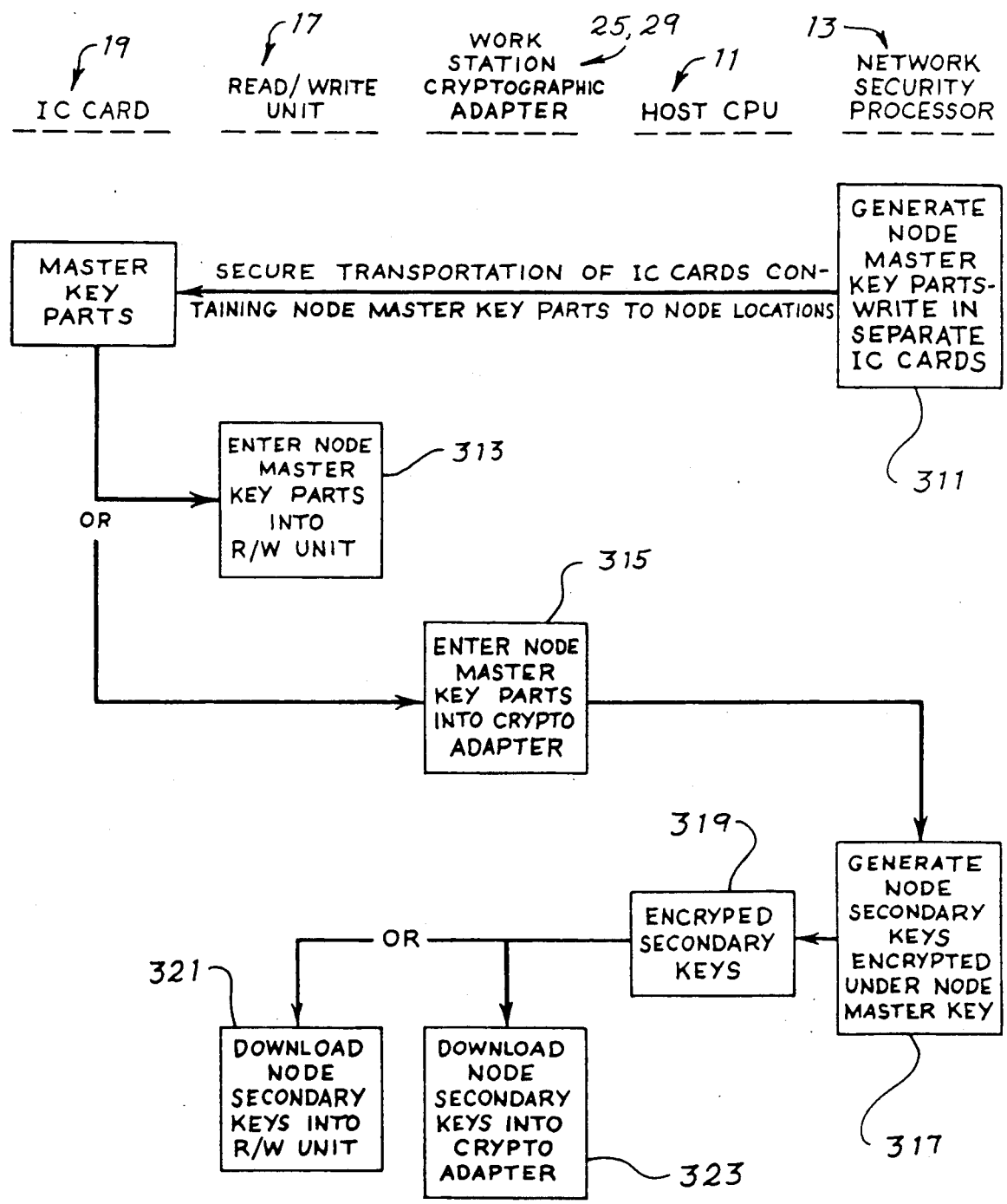
FIG. 13 shows how encryption keys are distributed.

FIG. 13 describes a method of cryptographic key initialization of the system security component devices of the system of the invention. Reference is made also to FIG. 1, The host CPU 11 responsible for overall key management for the system or network contains in its network security processor 13 a host master key under which the master node keys for all other network node devices are encrypted. The host master key is generated manually by a privileged and responsible individual (security administrator) in a highly secure and protected environment.

The host master key may be entered into the network security processor 13 in several different ways. Using IC cards 19 with the highest level of authority in its user authorization profile, the security administrator generates master key parts on his IWS 25, incorporating a cryptographic adapter 29 and IC card read/write unit 17, and then enters the host master key parts into the network security processor 13, using its attached IC card read/write unit 17. This is accomplished through the use of commands defined under a common cryptographic architecture specifying the cryptographic structure, commands and operation of all system security component devices in the system of the invention. The common cryptographic architecture is described in great detail in co-pending patent application Ser. Nos. 231,114; 233,575; 237,938; 238,010 and 344,165. Alternatively, the security administrator may enter the host master key into the network security processor 13 directly through the PIN pad keyboard of the IC card read/write unit under the authorization profile loaded into it from the security administrator's IC card.

The next step in the process of cryptographic key initialization of the system or network is to generate network node master keys encrypted under the host master key. Toward maximization of security in the transportation of the node master keys from the network security processor 13 to the remote network nodes, the node master keys are generated in parts and each part written into the secure memory of separate IC cards 19. This step is shown at block 311 in FIG. 13. Only after the key parts are sequentially imported from the pair of IC cards 19 containing the key parts to another system security component device, and cryptographically assembled, is the node master key usable. Importing or loading the key parts into other node devices is shown at steps 313 and 315 in FIG. 13.

After all system or network nodes have been so initialized with master node keys, node key encrypting keys may be generated by the central network security processor 13 under control of the key management application program running on the host CPU 11, and encrypted under the specific node master key which is held within a secure key directory in the network security processor 13. Other secondary keys such as data keys for specific purposes, may then be transported through the system facilities, encrypted under a nodes key encrypting key. This step appears at block 317 in FIG. 13. Transportation of these keys is effected through the host computer 11, as shown by step 319, to the system or network communications facilities. The secondary keys are downloaded at steps 321 and 323 in a secure session to each node represented by a security component device such as a cryptographic adapter 29 or an IC card read write unit 17. Depending on the key management structure in the application, the need for data keys to be held in common between the central network security processor 13 and other system or network nodes, and the level of key management control delegated to the system or network node, the secondary keys may include data keys for safeguarding the files and programs of the node device. Alternatively, these keys could be generated locally at the node under the node master key.

Figure 14:
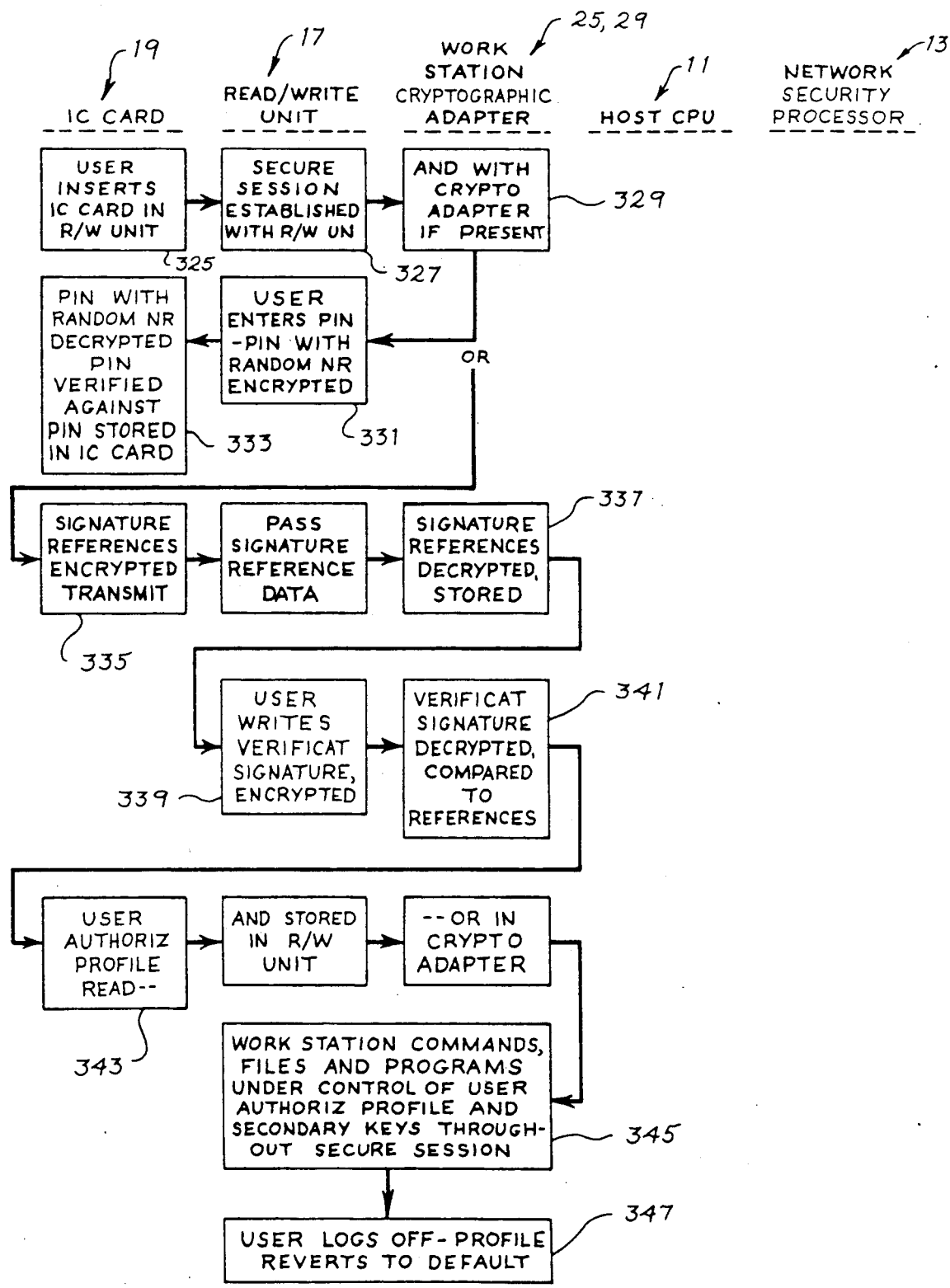
FIG. 14 shows two offline work station logon methods.

FIG. 14 illustrates the off-line intelligent work station (IWS) logon procedure in the system of the invention, using the system security component devices described in FIGS. 1 through 5 of this invention. Reference is made to FIG. 1 for devices identified therein.

When the user inserts the user's IC card, step 325, into the IC card read/write unit 17, those two devices establish a secure session between them in step 327. This action occurs transparently to the user, is built on the existence of a cryptographic processor in both devices, and results in a unique session key. When the secure session has been established, the cryptographic adapter 29, if it is present in the IWS, is advised by the IC card read/write unit 17 that the secure session has been established. At step 329, action is then initiated to establish a similar secure session between the IC card 19 and the cryptographic adapter 29. At the conclusion of that action, the IC card is in secure session with both of the other devices. The cryptographic adapter will attempt to establish a secure session with the reader at initialization of the cryptographic adapter. In the process of establishing secure sessions among these devices, the authenticity of each device is verified.

The next step in the logon procedure is to verify the identity of the user person to the IWS. FIG. 14 illustrates two methods of user verification: one based on the use of a secret pin verification number (PIN): and another based on the comparison of dynamic signature pattern data of a verification signature with that of reference signatures prerecorded in the IC card. Because the latter procedure is inherently less susceptible to compromise and more costly to implement than the former, the choice between the two reverts to a value judgment for each application.

The PIN verification is initiated at step 331 by a prompt to the user to enter the user PIN on the PIN pad of the IC card read/write unit 17. Within this unit, the PIN and a random number are encrypted using the session key, and passed across the protected interface to the IC card 19. Within the IC card 19 at step 333 the received quantity is decrypted, the random number is separated from the PIN. the PIN is verified against the user PIN stored in the IC card. Based on the result of the verification attempt, the random number is incremented by either a 1 or a 2 and encrypted to provide a protected response to the IC card read/write unit.

Alternatively, signature verification is initiated at step 335 by a request from the cryptographic adapter 29 to the IC card 19 to download the user's signature reference data. In the IC card, the signature reference data is read from secure memory, encrypted, and passed through the IC card read/write unit 17 to the cryptographic adapter 29, where it is decrypted at step 337 and held in memory.

The user is then prompted at step 339 to write a verification signature, and using the signature verification pen 27 attached to the IC card read/write unit 17, the user writes a signature. The analog signals from the pen are digitized and encrypted and passed across its protected interface to the cryptographic adapter 29, where the signature data is decrypted and placed in memory. Within the cryptographic adapter at step 341, the dynamic signature verification algorithms described in U.S. Pat. No. 4,724,542 are invoked to effect a confident match of the verification signature data against the multiple reference signature data sets.

Thus far in the off-line logon process, the authenticity of the security component devices have been validated and the user person's identity has been verified to the IWS. It remains to establish, within the security component devices of the IWS. the authorization to access IWS resources within time-of-day/day-of-week limits and more specifically to exercise the command set of the device, to utilize files and programs within the IWS.

Requests from the card reader 17 and the cryptographic adapter 29 to the IC card 19 would result at step 343 in the downloading of the user authorization profile to the IC card read/write unit 17 and to the cryptographic adapter 29. Then, as described in detail with FIGS. 7. 8 and 9, the user authorization profile, the command configuration data and cryptographic keys combine at steps 345 to control the use of commands, files and programs throughout the session.

On logoff, the user authorization profile that had been downloaded from the user's IC card to the cryptographic adapter is removed at step 347, and the cryptographic adapter reverts to its default profile.

Figure 15:
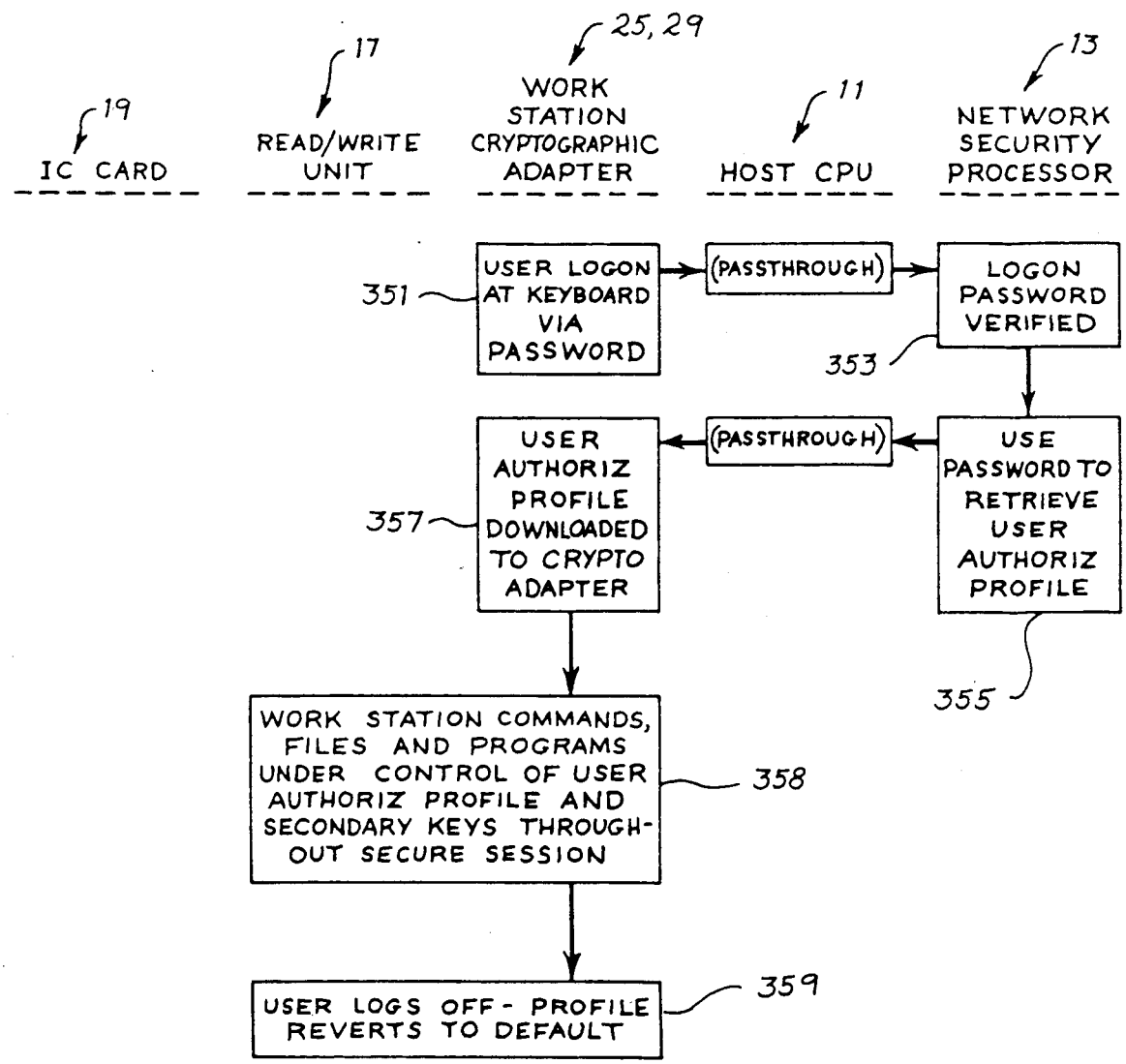
FIG. 15 shows an online work station logon method.

FIG. 15 illustrates the intelligent work station (IWS) on-line logon procedure, utilizing the cryptographic adapter as the only system security device in the IWS.

Through the communications facilities in the IWS 25 and the host CPU 11, a secure session is established between the cryptographic adapter 29 in the IWS and the network security processor 13. As it is in the off-line logon procedure described in connection with FIG. 14, the establishment of the on-line secure session is transparent to the IWS user.

User identification with this IWS configuration is initiated at step 351 by the entry of the user's password at the IWS keyboard in response to a prompt message. The logon password is verified at step 353 in the network security processor 13 against its directory of authorized users. A positive verification results in the retrieval at step 355 of the user authorization profile from the directory. The profile is then encrypted under the session key created for the session and the encrypted profile is downloaded at step 357 to the cryptographic adapter 29 in IWS 25.

The IWS 25 may then continue to operate in an on-line mode with the host CPU 11 as a continuation of the same secure session or under a subsequent secure session. The IWS may also revert to an off-line mode represented in step 357 in which the user authorization profile downloaded from the network security processor 13, the common configuration data resident in the cryptographic adapter 29 of the IWS 25, and the secondary cryptographic keys previously established in the cryptographic adapter all serve to control the use of commands, files and programs in the IWS. As in the off-line case, logoff at step 359 results in the removal of the downloaded user authorization profile and substitution of the default profile.

While the invention has been described with reference to a preferred embodiment thereof in the form of a transaction security system including an IC card, it will be apparent to those skilled in the art of computer system design that the principles, methods, and apparatus of the invention can be applied in other environments to enhance the security and prevent fraud.

What is claimed is:

1. A security device comprising: a data processor: memory connected to said processor; data input and output means connected to said processor;

secure session establishing means programmed into said security device for controlling said processor to establish a secure session with another device:

an authorization profile stored in said memory, said profile defining the authority of a user of said security device to cause said processor to execute programmed commands:

transfer means for transferring at least part of said authorization profile from said security device to said another device for controlling said another device in accordance with said authority of said user defined in said authorization profile.

2. The security device of claim 1, wherein said security device is an IC card and said another device is an IC card reader.

3. The security device of claim 1, wherein said security device is a host computer and said another device is a computer work station.

4. The security device of claim 1, wherein said authorization profile defines the authority of said user to execute a command at a particular time.

5. The security device of claim 1, wherein said authorization profile defines the authority of said user to execute a command on a particular day.

6. The security device of claim 1, wherein said authorization profile defines the authority of said user to execute a command between particular times of day.

7. The security device of claim 1, wherein said authorization profile contains a plurality of command flags, each command flag defining the authority of said user to execute a command.

8. The security device of claim 1, wherein said authorization profile contains a plurality of access flags, each access flag defining the authority of said user to access a data file.

9. The security device of claim 1, wherein said authorization profile contains a plurality of program flags, each program flag defining the authority of said user to execute a program.

10. The security device of claim 1, wherein said authorization profile contains a user authorization level.

11. The security device of claim 1, wherein said authorization profile contains a user ID, a personal identification number, and an identity verification method identifier.

12. The security device of claim 2, wherein said authorization profile defines the authority of said user to execute a command at a particular time.

13. The security device of claim 2. wherein said authorization profile defines the authority of said user to execute a command on a particular day.

14. The security device of claim 2, wherein said authorization profile defines the authority of said user to execute a command between particular times of day.

15. The security device of claim 2, wherein said authorization profile contains a plurality of command flags, each command flag defining the authority of said user to execute a command.

16. The security device of claim 2, wherein said authorization profile contains a plurality of access flags, each access flag defining the authority of said user to access a data file.

17. The security device of claim 2, wherein said authorization profile contains a plurality of program flags, each program flag defining the authority of said user to execute a program.

18. The security device of claim 2, wherein said authorization profile contains a user authorization level.

19. The security device of claim 2, wherein said authorization profile contains a user ID, a personal identification number, and an identity verification method identifier.

20. The security device of claim 3, wherein said authorization profile defines the authority of said user to execute a command at a particular time.

21. The security device of claim 3, wherein said authorization profile defines the authority of said user to execute a command on a particular day.

22. The security device of claim 3, wherein said authorization profile defines the authority of said user to execute a command between particular times of day.

23. The security device of claim 3, wherein said authorization profile contains a plurality of command flags, each command flag defining the authority of said user to execute a command.

24. The security device of claim 3, wherein said authorization profile contains a plurality of access flags, each access flag defining the authority of said user to access a data file.

25. The security device of claim 3, wherein said authorization profile contains a plurality of program flags, each program flag defining the authority of said user to execute a program.

26. The security device of claim 3, wherein said authorization profile contains a user authorization level.

27. The security device of claim 3, wherein said authorization profile contains a user ID, a personal identification number, and an identity verification method identifier.

28. A security device comprising:
a data processor;
memory connected to said processor:
data input and output means connected to said processor:
secure session establishing means programmed into said security device for controlling said processor to establish a secure session with another device:
means for receiving at least part of an authorization profile stored in a memory of said another device, said profile defining the authority of a user to cause said processor to execute programmed commands.

29. The security device of claim 28, wherein said security device is an IC card reader and said another device is an IC card.

30. The security device of claim 28, wherein said security device is a computer work station and said another device is a host computer.

31. The security device of claim 28, wherein said authorization profile defines the authority of said user to execute a command at a particular time.

32. The security device of claim 28, wherein said authorization profile defines the authority of said user to execute a command on a particular day.

33. The security device of claim 28, wherein said authorization profile defines the authority of said user to execute a command between particular times of day.

34. The security device of claim 28, wherein said authorization profile contains a plurality of command flags, each command flag defining the authority of said user to execute a command.

35. The security device of claim 28, wherein said authorization profile contains a plurality of access flags, each access flag defining the authority of said user to access a data file.

36. The security device of claim 28, wherein said authorization profile contains a plurality of program flags, each program flag defining the authority of said user to execute a program.

37. The security device of claim 28, wherein said authorization profile contains an authority level.

38. The security device of claim 28, wherein said authorization profile contains a user ID, a personal identification number, and an identity verification method identifier.

39. The security device of claim 29, wherein said authorization profile defines the authority of said user to execute a command at a particular time.

40. The security device of claim 29, wherein said authorization profile defines the authority of said user to execute a command on a particular day.

41. The security device of claim 29, wherein said authorization profile defines the authority of said user to execute a command between particular times of day.

42. The security device of claim 29, wherein said authorization profile contains a plurality of command flags, each command flag defining the authority of said user to execute a command.

43. The security device of claim 29, wherein said authorization profile contains a plurality of access flags, each access flag defining the authority of said user to access a data file.

44. The security device of claim 29, wherein said authorization profile contains a plurality of program flags, each program flag defining the authority of said user to execute a program.

45. The security device of claim 29, wherein said authorization profile contains an authority level.

46. The security device of claim 29, wherein said authorization profile contains a user ID, a personal identification number, and an identity verification method identifier.

47. The security device of claim 30, wherein said authorization profile defines the authority of said user to execute a command at a particular time.

48. The security device of claim 30, wherein said authorization profile defines the authority of said user to execute a command on a particular day.

49. The security device of claim 30, wherein said authorization profile defines the authority of said user to execute a command between particular times of day.

50. The security device of claim 30, wherein said authorization profile contains a plurality of command flags, each command flag defining the authority of said user to execute a command.

51. The security device of claim 30, wherein said authorization profile contains a plurality of access flags, each access flag defining the authority of said user to access a data file.

52. The security device of claim 30, wherein said authorization profile contains a plurality of program flags, each program flag defining the authority of said user to execute a program.

53. The security device of claim 30, wherein said authorization profile contains an authority level.

54. The security device of claim 30, wherein said authorization profile contains a user ID, a personal identification number, and an identity verification method identifier.

55. An identification card comprising:
a data processor:
protected programmable memory connected to said processor;

data input and output means connected to said processor:

an authorization profile stored in said memory, said profile defining the authority of a user of said card to cause said processor to execute programmed commands;

means for receiving an authorization profile created by an authorized person and storing said received authorization profile into said memory to be used in place of said stored authorization profile.

56. The security device of claim 55 wherein said device is an IC card.

57. The IC card of claim 56 further comprising:

data blocks in said memory, each data block having a header, said header containing memory access prerequisites; and means for comparing said access prerequisites with the authorization profile of said user.

58. The IC card of claim 57 wherein one of said access prerequisites is an authority level and further comprising:

means for comparing said authority level with an authorization level stored in said users authorization profile.

59. The IC card of claim 57 wherein one of said access prerequisites comprise a read flag and a write flag for each user and further comprising:

means for allowing read access to said memory only if said read flag is set and allowing write access to said memory only if said write flag is set.

60. The IC card of claim 57 wherein one of said access prerequisites is a secure session required flag and further comprising:

means for allowing access to said memory only is said IC card is in a secure session with another device which is requesting access to said memory.

61. A security device comprising:

a data processor:

protected programmable memory connected to said processor;

data input and output means connected to said processor:

a plurality of commands for controlling said processor stored in said memory, each command having a plurality of programmable execution prerequisites stored in said memory.

62. The security device of claim 61 wherein one of said execution prerequisites is an established secure session between the devices affected by the command, whereby the command to which it relates will not be executed unless a secure session has previously been established.

63. The security device of claim 61 wherein one of said execution prerequisites is an initial user verification whereby the command to which it relates will not be executed unless the identity of the user requesting the execution of the command has previously been verified during a current session.

64. The security device of claim 61 wherein one of said execution prerequisites is a pre-execution user verification whereby the command to which it relates will not be executed unless the identity of the user requesting the execution of the command has been verified specifically for each execution of said command to which it relates.

65. The security device of claim 61 wherein one of said execution prerequisites is time, whereby a command to which it relates will not be executed unless the time and date are within the limits authorized during which a user requesting execution of said command is authorized to execute said command.

66. The security device of claim 61 wherein one of said execution prerequisites is an authorization level, whereby a command to which it relates will not be executed unless a user requesting execution of said command has an authorization level at or above a specified level.

67. The method of communicating a secure boolean response comprising the steps of:
a) generating a random number in a security device:
b) encrypting said random number under a key;
c) sending said encrypted random number to another security device;
d) decrypting said encrypted random number in said another security device:
e) modifying said random number by a first function if said response is true:
f) modifying said random number by a second function if said response is false:
g) encrypting said modified random number:
h) sending said encrypted modified random number to said first security device;
i) decrypting said encrypted modified random number at said first security device: and
j) comparing said modified random number with said random number to determine the response.

68. The method of changing a value used in the generation of a random number comprising the steps of:
a) generate a first random number:
b) using a portion of said random number to select a bit of said value:
c) inverting said bit:
d) repeat steps a, b, and c to generate a second random number.

* * * * *

UNITED STATES PATENT AND TRADEMARK OFFICE
CERTIFICATE OF CORRECTION

PATENT NO. : 5,048,085
DATED : September 10, 1991
INVENTOR(S) : D.G. Abraham, et al It is certified that error appears in the above-indentified patent and that said Letters Patent is hereby corrected as shown below:

Column 20, lines 26-52, cancel "67. The method of" to and including "dom number".

Signed and Sealed this

Nineteenth Day of April, 1994

Attest:

BRUCE LEHMAN

Attesting Officer       Commissioner of Patents and Trademarks